United States Patent [19]

Olsen, Sr.

[11] Patent Number: 4,653,220

[45] Date of Patent: Mar. 31, 1987

[54] FISHING LURE HOLDER AND ENCLOSURE

[76] Inventor: Vernon R. Olsen, Sr., 2416 Oakwood Dr., SE., Grand Rapids, Mich. 49506

[21] Appl. No.: 794,834

[22] Filed: Nov. 4, 1985

[51] Int. Cl.$^4$ ............................................. A01K 97/06
[52] U.S. Cl. ..................................................... 43/57.1
[58] Field of Search ...................... 43/57.1, 54.1, 57.2

[56] References Cited

U.S. PATENT DOCUMENTS

| 2,020,394 | 11/1935 | Bates | 43/57.1 |
| 2,681,201 | 6/1954 | Grunwald | 43/54.1 |
| 2,801,492 | 8/1957 | Katwyk | 43/57.1 |
| 3,797,161 | 3/1974 | Smallwood | 43/57.1 |

FOREIGN PATENT DOCUMENTS 1108222  1/1956  France .............................. 43/57.1

Primary Examiner—Gene P. Crosby
Attorney, Agent, or Firm—Price, Heneveld, Cooper, DeWitt & Litton

[57] ABSTRACT

A retainer-receptacle for fishing lures has a dished base and a pivotal closure lid. Retainer members, in a preferred embodiment, have an accordion-fold, pleated structure formed of sheet-like material which in use is gathered together such that the pleated portions between the folds are disposed generally parallel to one another and form resiliently biased object-retention surfaces which may be moved apart from one another to receive an object and which when released are resiliently biased toward toward one another to provide light frictional retention of an object disposed between two such adjacent surfaces. In an alternative form, the retention members comprise separate individual slat-like elements which are resiliently biased toward one another by a block of elastomeric foam or the like.

10 Claims, 5 Drawing Figures

FISHING LURE HOLDER AND ENCLOSURE

BACKGROUND OF THE INVENTION

This invention relates generally to fishing equipment, and to article-holding means and enclosures therefor; more particularly, the invention relates to a portable, self-contained, fishing lure-retaining and enclosing device for use by sport fisherman, particularly those who use small lures such as flies, poppers, "bugs", and the like, which typically comprise essentially a single fishing hook which carries or has been incorporated into fish-baiting objects or members disposed along the shank of the hook to conceal it and make it resemble fish food.

The spectacle of a tangled or jumbled fishing tackle box is a relatively familiar one to most people, and particularly sport fishermen. This spectacle, while perhaps sometimes overdone in jest, nonetheless has substantial validity in fact. Fishermen typically have many small items such as hooks, flies, lures, etc., which are usually kept rather loosely in various compartments inside a tackle box, and the contents of tackle boxes are frequently jumbled together during use, either through carelessness, accident, exciting moments during fishing, lack of sufficient light (as when fishing after sunset or at night), etc.

As a result, most tackle boxes require laborious and time-consuming reorganization on a comparatively frequent basis and, where this is not done, fishing is frequently disrupted or made difficult by the inability to find particular lures when they are needed or desired, or to extricate the desired lure from others under such circumstances. These adverse effects are all the more objectionable in fly fishing, or fishing with small lures such as spinners, popping bugs, etc., since their comparatively small size and low weight makes them all the more subject to becoming lost or misplaced within a tackle box or other such container. Of course, it is well known that fly fishermen and others who use small baits or lures frequently hook them into or upon a hatband, or on hats or vests especially equipped with fleece or other such material provided expressly for that purpose; however, actually using such a method during fishing is not as simple or desirable as is popularly believed, since the small lures may well not detach readily from the place where they are hooked, or may simply slip out of place and be lost if not securely hooked in the first place, and there are many other such disadvantages as well.

Consequently, the need persists for a simple, easy and convenient means by which to retain small items such as fishing lures, which will provide easy and sure securement and release of the lures whenever desired during fishing, which holds the lures separately and independently from one another, which is comparatively small and light in weight, inexpensive to manufacture and purchase, et cetera.

SUMMARY OF THE INVENTION

The present invention provides a unique and effective solution for the problems prevailing in the present state of the art, as discussed above, in the form of a specially-adapted receptacle, preferably with its own enclosure, which is light in weight, small in size, inexpensive to manufacture, easy to use, and which safely and securely holds a large number of fishing flies and other such lures in proportion to the size of the receptacle. Further, the receptacle and storage apparatus in accordance with the invention does not require any particular placement or manipulation in order to safely and securely hold the lures to be stored therein, which may be simply and quickly inserted and removed in an easy and convenient manner, without snagging or other such complexities, and yet the apparatus holds the lures securely and protectively in place until they are needed, all without significant wear and tear on either the lures or the retention means within the receptacle or enclosure.

Very briefly summarized, a receptacle in accordance with a preferred embodiment of the invention comprises a support base, preferably in the form of a shallow tray with upstanding sides, a closure lid hinged or otherwise movably mounted upon the base, means for securing the lid and base together as an enclosure, and a plurality of generally parallel and closely-adjacent, or laterally-stacked, contiguous, slat-like members, whose adjacent sides define narrow slit-like recesses between them for receiving a portion of a fish hook or other such part of a fishing lure, or an analogous structure in the case of other specific items to be stored, together with means for resiliently biasing the slat-like members toward and against one another with a light resiliency force, by which the hooks or other such members are held in place within their narrow receiving slits. Such resilient force may be provided, and preferably is, by the inherent resiliency of the material forming the slat-like members, and in a preferred embodiment the latter are provided by an accordian-pleated sheet of thin material, such that the living hinge sections between adjacent parts of the pleated structure provides a natural and inherent resilient biasing means, particularly when the pleated structure is elastically compressed or restrained in a lateral sense, i.e., normal to the axis of the pleats.

DESCRIPTION OF THE PREFERRED EMBODIMENTS

Figure 1:
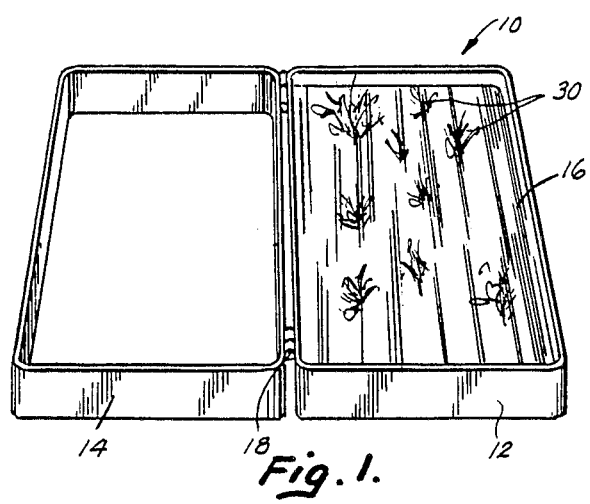
FIG. 1 is a front perspective view of an enclosure receptacle and retaining means in accordance with the invention, shown in an open position and with a small number of fishing lures retained in place.

Referring now in more detail to the drawings, the receptacle 10 as shown in FIG. 1 generally comprises a support base 12, or bottom, a closure lid 14, or top, and object-retention means 16 disposed within or upon the base 12. Preferably, the support base 12 and closure lid 14 are comparatively shallow, dished, rectangular members with upstanding sides, so as to form, in effect, a box-like enclosure when the top is placed in superposition upon the bottom. Structurally, the top and bottom may be substantially identical and may conveniently be injection-molded or similarly formed from any of a number of standard polymeric materials widely in use.

Figure 2:
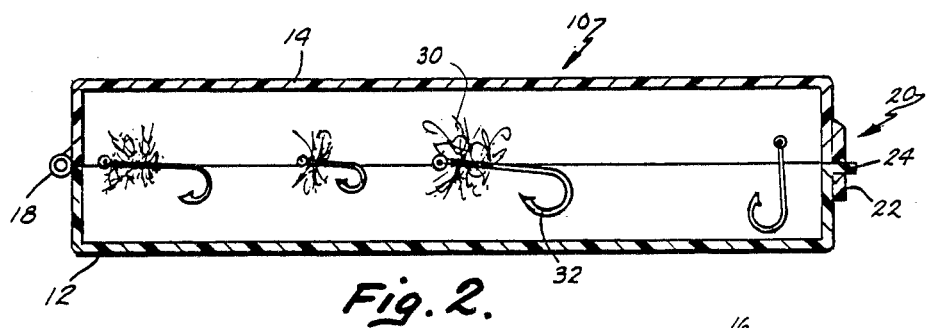
FIG. 2 is an enlarged cross-sectional elevation of an enclosure receptacle in accordance with the invention, shown in a closed position.

As illustrated in FIG. 2, the base (bottom) 12 and lid (top) 14 are preferably hinged together at 18, to provide for opening the enclosure in a manner generally illustrated in FIG. 1. While an axle or pintle-type hinge is illustrated at 18, the entire structure comprising the base, lid and hinge may all be formed as a one-piece injection-molded unit, in which the hinge comprises a narrowed section of the polymeric material, thereby constituting a "living hinge." Also, a latch means 20 is preferably provided, by which the enclosure may be maintained in a closed position when not in use.

The latch means 20 may conveniently comprise a depending tab 22 secured to or made integral with the lid 14, but either being flexible in nature or otherwise hinged to the lid. The latch tab 22 may conveniently operate by having an aperture which receives a projecting pin 24, which is secured to or made integral with the support base 12, such that the aperture in the tab resiliently enlarges slightly to receive the pin in frictional engagement. Of course, various other types of "latches" (or retaining means) would be suitable for the intended purpose, and in fact in the broader aspects of the invention, the lid 14 may merely be removably supportable upon the base 12, as for example having a slightly larger overall size whereby the depending edges of the lid fit snugly over the upstanding edges of the base in frictional engagement. In such a construction, at least slight resiliency of at least the edges of the base and lid tend to augment convenient detachment of the lid while at the same time facilitating secure engagement.

Figure 3:
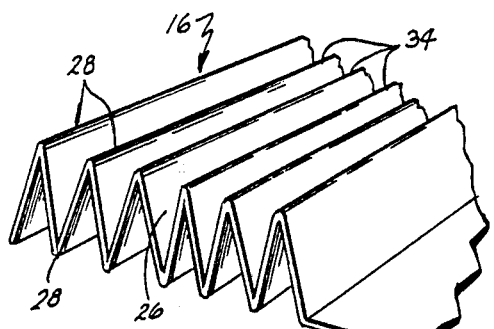
FIG. 3 is a fragmentary perspective view of the preferred accordion-pleated storage media, shown in a semi-relaxed disposition.
Figure 4:
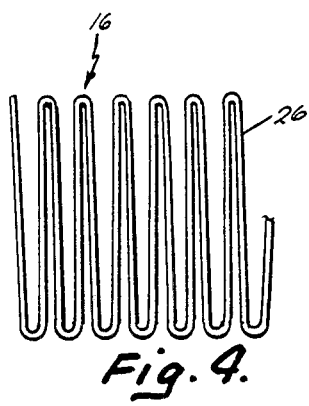
FIG. 4 is a fragmentary end elevation showing the accordion-pleated media of FIG. 3.

The object-retention means 16 preferably comprises an accordion-pleated type of structure such as that illustrated at 26 in FIGS. 3 and 4. Such a structure may conveniently be formed of sheet-like stock such as treated paper or polymeric sheet, preferably of at least moderate thickness (on the order of, for example, 0.025 inch) which may be folded into the pleated form shown by any of several known types of pleating machines. While the specific media for forming the pleated structure 26 is in a sense not critical, certain attributes are definitely to be desired over others, e.g., the material should have sufficient stiffness to resist crushing deformation of the angular pleat folds under light manual pressure, and it also should preferably be waterproof, either in its inherent nature or by application of a suitable surface coating. Additionally, a desirable attribute is surface lubricity, which may be obtained simultaneously with the quality of water-resistancy, e.g., by a surface coating or layer of thin lubricious polymeric material, for example any of the materials conventionally used as, or on, the "liners" which protectively cover adhesive-coated surfaces, and which are readily releasable from the adhesive due to the surface lubricity of the liner.

One specific type of material which is very advantageous for use as the retention means 16 is the spun-bonded polyester sheet material sold under the trademark "REMAY" by DuPont Corp., which is typically used as a filter material. This material comprises randomly-laid polyester fibers which are heat-bonded to one another to form a sheet. This material has the advantage of being porous, and thus water-pervious, without being hygroscopic. It is also thermosetting in nature, so that the pleats can be thermally "set" once formed, and thus resist deformation while having a very satisfactory degree of inherent resiliency. Of course, other specific materials may also be utilized, including non-porous sheet stock, and hygroscopic materials may be useful if they do not deteriorate after becoming wet, since such materials will tend to remove any water adhering to hooks or lures stored between adjacent folds or layers, and then dissipate the water by evaporation over a comparatively large surface area.

The preferred accordion-pleated structure 16 has the advantage of not only being one-piece and thereby permitting simple and fast assembly, but in addition provides in effect a plurality of adjacent living hinges 28 at each angular bend in the material which forms the pleats. While it is desirable to have the pleats formed with reasonably sharp outside corners, it is also desirable to leave a certain amount of internal resiliency at each such angular deformation, i.e., to not completely "break" the corners. Thus, the normal "relaxed" or unconstrained form of the pleated structure 26 will typically be somewhat as shown in FIG. 3, i.e., an undulating, angular corrugation, rather than the comparatively closely-adjacent form shown in FIG. 4, for example, in which the "slat" elements are constrained into more nearly parallel relation (a condition referred to herein by the expression "generally parallel", which of course does not mean literally or exactly parallel).

As illustrated in FIGS. 1 and 2, the object-retention means 16 (i.e., the pleated structure 26, or the independent slat-type laterally-stacked structure 30 of FIG. 5, to be discussed hereinafter) preferably fills substantially the entire interior of the support base 12 and is retained in place thereupon by the upstanding peripheral edges of the base. Where the preferred accordion-pleated object-retention means is utilized, the pleats are resiliently gathered together by squeezing (elastically compressing) the pleated structure transversely and then placing it within the enclosing peripheral walls of the support base. Due to the inherent resiliency of the pleated structure 26, it will tend to return to the relaxed form shown in FIG. 3, but since it is constrained in place by the peripheral walls of the support base, it is only able to relax slightly, or partially, thereby maintaining flexure of the angular folds and ensuring the existence of at least a light resiliency to each of the adjacent folds, particularly along and adjacent each of the pleat corners 28.

This resilient bias not only serves to retain the pleated structure in the desired position upon the support base 12, but it also facilitates use of the apparatus. That is, as shown in FIGS. 1 and 2, the various different fishing lures 30 are retained in place merely by having their barbed or hooked end extremities 32 frictionally held between adjacent pleat folds 28, i.e., within the narrow space 34 located between each adjacent fold. Insertion of each lure into this position may readily be accomplished merely by pushing the hook or barbed end 32 downwardly against the top of the object-retention means generally, whereupon the hook ends 32 of the lures will inevitably move between the side surfaces of the closely-adjacent slat-like retainer members of adjacent pleats and into the narrow slits 34 therebetween, rather than aligning with and remaining in direct abutment with any of the specific pleat corners 28, since the upwardly-oriented pleat corners act as edges which deflect and guide the hook ends laterally one way or the other.

Thus, each of the narrow slit-like openings 34 in effect is defined by a double-walled structure whose downwardly-extending slat-like portions brace one another and are in turn braced by the next adjoining folded pleat on each opposite side. Of course, the inherent resiliency of the folded structure also facilitates this operation, since it allows the adjoining pleats on each side of a slit into which a fishing lure is pressed to resiliently deflect sideways a slight distance, thereby in effect opening the narrow slit enough to receive the hook. Of course, once the hook has been slid into place between adjacent pleats and then released, the natural resiliency of the structure holds the hook lightly in place, securely retaining it by friction until the next time it is to be used, whereupon it may readily be removed merely by grasping it and pulling it upward with very light pressure. During such removal, the lure slides readily out from its position of prior confinement, since the hooked extremities basically follow the shank of the hook upwardly, moving in parallel with it out of the slit.

As indicated above, a coating of lubricious polymeric material will facilitate such insertion and withdrawal of the barbed hook end, although it is not strictly necessary, and it has been found that even relatively coarse paper-like materials formed into the pleated shape described above do not experience any significant amount of snagging, et cetera of the barbed end of the hook between the folds or strips of material. As additionally noted above, however, it is useful to utilize sheet stock having non-wetting or "waterproof" characteristics, particularly in the accordion-pleated form of the retention means, since of course when the invention is utilized in connection with fishing lures there may often be water on the hooks and lures when they are returned to the object-retention structure, and such water will inevitably collect, to at least some extent, in the bottom of each accordion fold in which a lure has been retained. Thus, where soft, absorbent sheet material is used, undue water saturation may promote premature damage and/or structural disintegration of the pleated member. As will be appreciated, not all water-absorptive materials are necessarily degraded or deterioriated by water, but where this is a problem lubricious coatings of polymeric materials or the like may often provide a desired non-wetting characteristic as well as one of surface lubricity.

Figure 5:
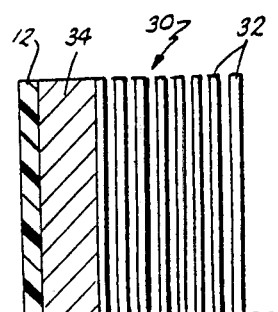
FIG. 5 is an end elevational view similar to FIG. 4 but showing an alternative form of storage media and resilient biasing means therefor.

As indicated previously, a modified form of the object-retention means 16 is illustrated in FIG. 5, wherein the same is designated by the numeral 30. In this form of the invention, a series of independent slat-like members 32 are stacked laterally adjacent one another, with the upstanding end, or side, edge of each such slat representing, in effect, the pleat edge 28 of the previously-described embodiment. Thus, articles to be retained, e.g. fish hooks, are inserted between adjacent slats in much the same manner as in the previously-described embodiment, with the opposite sides of each such slat-like member representing or analogous to the side extremities of each pleated segment described above, although the latter may tend to be disposed somewhat more angularly (less parallel) with respect to one another. Both such conditions are intended to be conveyed by the term "generally parallel" as used herein. In this type of embodiment, the same type of base 12 and lid 14 may be utilized, and the base 12 is substantially filled with the laterally-adjacent, mutually-independent slat-like members 32; however, since the inherent resiliency provided by the integrally hinged elements in the pleated structure is not present, it will typically be desirable to incorporate an additional resilient biasing element 34, which may constitute a rectangular or other such strip of resilient polymeric foam or the like. Such a strip will assist in retaining the individual segments or slats in place within the base, in effect forcing the slats toward and against one another to maintain an integrated structure, while at the same time providing the desired resilient biasing forces to retain fishing lures or the like inserted into position between the adjacent slats. In some instances, where the slats are themselves formed of somewhat compressible material, the additional biasing strip 34 may not be necessary. In both embodiments, additional securement means for the object-retaining member 16 may be provided, for example the interior surface of the base 12 may be coated with a desired adhesive, permanently anchoring the object-retaining means 16 in place. In such an embodiment, the resilient compression of the different adjacent slat-like members will function in the same basic manner as the pleated structure described above, since the upper extremities may freely move laterally with respect to one another, to permit insertion of objects which are to be retained.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiments shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language specifically state otherwise.

The embodiments of the invention in which an exclusive property or privilege is claimed are defined as follows:

1. A retainer-receptacle for receiving and holding fishing lures and like objects, comprising means providing a support base; a closure lid and means for movably mounting said lid upon said support base such that the lid may be moved toward and away from the base and the lid and base together form a reclosable containment device; and means defining a plurality of closely-adjacent slat-like retainer members supported at their bottom edges by said base, said members having side surfaces which are disposed generally parallel to one another and self supported upstanding top edges; said side surfaces of said retainer members being at least slightly movable apart from one another along their respective top edges and angularly relative to their bottom edges, to provide narrow slit-like spaces between their adjacent side surfaces, said slit-like spaces having a width sufficiently narrow to receive fishing gear therein between and in contact with the side surfaces of adjacent retainer members; and means for resiliently biasing said retainer members toward one another to produce at least light frictional contact between objects inserted into said narrow spaces and the adjacent side surfaces of said retainer members, to thereby retain such objects in place between adjacent retainer members.

2. A retaining receptacle as recited in claim 1, wherein said means defining said slat-like retainer members comprise an accordion-fold pleated structure.

3. A retaining receptacle as recited in claim 1, wherein said means for resiliently biasing includes at least in part a resilient structure comprising portions of said means defining slat-like retainer members.

4. A retaining receptacle as recited in claim 3, wherein said resilient structure comprises living hinge sections of said slat-like retainer members.

5. A retaining receptacle as recited in claim 4, wherein said means defining said slat-like retainer members comprise an accordion-fold pleated structure.

6. A retaining receptacle as recited in claim 1, wherein said slat-like retainer members comprise strips of sheet-like material disposed in side-by-side relation to one another.

7. A retaining receptacle as recited in claim 6, wherein said sheet-like material comprises paper.

8. A retaining receptacle as recited in claim 7, wherein said paper has a water-resistant surface.

9. A retaining receptacle as recited in claim 8, wherein said water-resistant surface has lubricious characteristics.

10. In a device for holding and retaining fishing lures and other such small objects, of the general type having a dished receptacle providing a generally planar support base, the improvement for receiving and holding said objects which comprises means defining a plurality of closely-adjacent slat-like retainer members supported at their bottom edges by said base, said members having stiff side surfaces which are disposed generally parallel to one another and self supported upstanding top edges; said side surfaces of adjacent retainer members being at least slightly movable apart from one another along their respective top edges and angularly relative to their bottom edges, to provide narrow slit-like spaces between their adjacent side surfaces, said slit-like spaces having a width sufficiently narrow to receive fishing gear therein between and in contact with the side surfaces of adjacent retainer members; and means for resiliently biasing said retainer members toward one another to produce at least light frictional contact between objects inserted into said narrow spaces and the adjacent side surfaces of said retainer members, to thereby retain such objects in place between adjacent retainer members.

* * * * *